INVENTOR.
James Donald Walker
BY
Darbo, Robertson & Vandenburgh
Att'ys

March 22, 1966  J. D. WALKER  3,242,071
INTERMITTENT STIRRING APPARATUS FOR DIGESTERS
AND METHOD OF OPERATING A DIGESTER
Filed Nov. 13, 1961  2 Sheets-Sheet 2
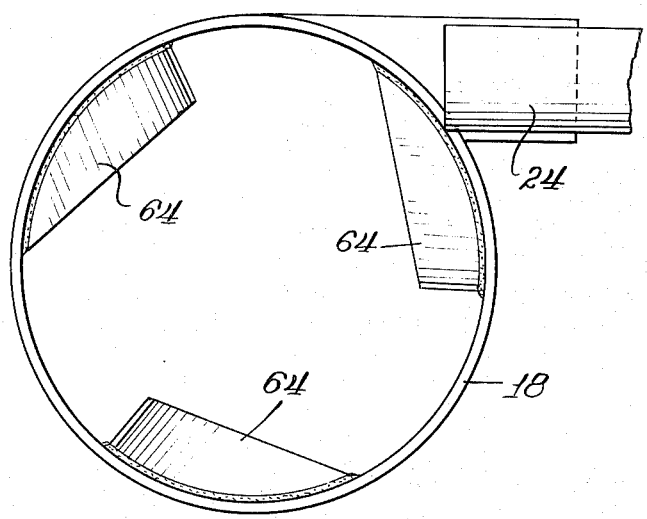
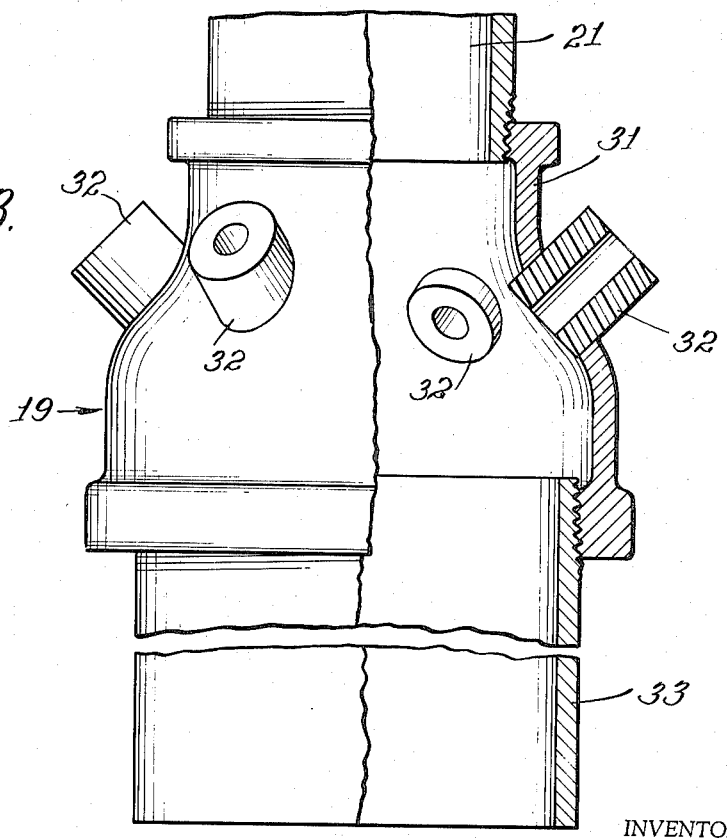
INVENTOR.
James Donald Walker
BY
Att'ys.

United States Patent Office 3,242,071
Patented Mar. 22, 1966

3,242,071
INTERMITTENT STIRRING APPARATUS FOR DI-
GESTERS AND METHOD OF OPERATING A
DIGESTER
James Donald Walker, Aurora, Ill., assignor, by mesne
assignments, to Walker Process Equipment, Inc., Wilmington, Del., a corporation of Delaware
Filed Nov. 13, 1961, Ser. No. 151,950
12 Claims. (Cl. 210—14)

This application is a continuation-in-part of application Ser. No. 18,761, filed Mar. 30, 1960, expected to issue concurrently herewith, and of application Ser. No. 56,132, filed Sept. 15, 1960 (Patent No. 3,194,756, issued July 13, 1965). The first of these applications is intended to claim generically the blow-out tube features of which a species described therein, and illustrated in Ser. No. 56,132, is disclosed in more detail and claimed herein.

In sewage treatment plants, most of the liquid received is ultimately discharged (usually to a stream) as a clear relatively harmless effluent, leaving behind a sludge. This sludge includes the solids with enough water to be liquid. The usual treatment of this sludge is called "digestion." Digestion takes place in a huge tank, perhaps 40 feet to 100 feet in diameter. When the tanks have roofs excluding air, such digestion is called "anaerobic digestion." The present invention relates especially to this field.

It has long been recognized that stirring the contents of digesters is advantageous. Seeding raw sludge with sludge already well along in the digestion process greatly speeds up the digestion of the raw sludge. Thoroughly stirring substantially the entire contents of the digester accomplishes this seeding, and probably does so in the most advantageous way, namely, by dispersing the raw sludge as thoroughly as practicable throughout the body of digesting sludge so that each particle of raw sludge has the greatest practicable contact with seed sludge, and the beneficial bacteria in all areas are given food on which to work. Thorough mixing has another advantage of avoiding the tendency for the formation of a scum blanket which occupies digester space without accomplishing much digestion.

In the past there has been an assumption, perhaps widespread, that continuous stirring of the digester would accomplish the best digestion. In fact, however, there are disadvantages in continuous stirring. One is the cost. Another is the fact that in many plants any sludge drawn from the digester during or soon after the introduction of raw sludge to the digester, will include a percentage of the raw sludge. If the digester is operated on a ten-day displacement basis, and the volume of green sludge introduced is ten percent of the digester volume, it follows that if it were immediately thoroughly intermixed, the sludge then transferred would be ten percent raw sludge. This is an oversimplification, but in any event the percentage of raw sludge in transfer sludge can, under such circumstances, be high enough to be objectionable.

One reason continuous stirring has been common is because some stirring equipment was not suited for intermittent stirring. For example, some types of equipment did not have enough circulating action to be reliable in drawing up into the circulating movement within the digester heavy sludges which had once been allowed to settle to the bottom of the digester. In some respects, the most desirable type of digester stirring accomplishes the stirring by the lifting action of gas used as in a gas-lift pump, or pumped into the digester deep below the surface. As stirring in these manners has been extensively practiced, the continuous operation of the gas-lift apparatus was almost a necessity, as there would be very severe clogging if the diffusion of gas should be frequently discontinued.

According to the present invention, the gas-lift equipment (preferably a type producing adequate stirring power) is so designed that it is not at all adversely affected by frequent cessation of the gas supply to it. During the "off" period, the digester contents are allowed to enter freely into the lower portion of the gas supply system (which extends downwardly from the roof of the tank), but the construction is such that even though a considerable time may elapse before restoration of the supply of gas, the liquid contents, together with any solids therein, will be blown freely and promptly from the gas supply channels through a special blow-off passage.

The present application is also intended to cover other inventive features making use of this suitability for intermittent operation. Preferably the pumping of raw sludge, the operation of the gas-lift stirring apparatus and the transfer of sludge from the digester are correlated by means which ensure a given sequence of operation to prevent the discharge from the digester of any of the sludge freshly introduced to it. Prior efforts toward this end have discontinued stirring during pumping of sludge into the digester, with supposedly concurrent overflow transfer from the digester. However, the present invention recognizes that inasmuch as the sludge tends to continue to transfer for a considerable period after the raw sludge introduction has ceased, further safeguards are beneficial. This aspect of the invention provides that either the stirring will be further delayed, or there will be means for terminating the transfer of sludge when the supply of gas to the gas-lift stirring apparatus is begun.

According to another aspect of this application, the ability to run intermittently satisfactorily is also used advantageously in another respect. Just before transferring sludge, and preferably at least six hours after the last introduced raw sludge was thoroughly intermixed, the supply of gas to the gas-lifter is discontinued. Under these conditions, the most thoroughly digested sludge tends to settle to the lower part of the digester. Usually, also, a layer of supernatant will form at the surface, although this supernatant may or may not be of satisfactory quality. In some instances proper programming of this type may permit the withdrawal of satisfactory settled sludge from the digester and satisfactory supernatant, without the use of a separate settling tank, and without loss of any digestion efficiency of the main tank. In other instances, the digested denser sludge drawn from the bottom should still be transferred to the secondary tank for further settling, and separate withdrawal of supernatant and denser settled sludge.

Additional objects and advantages of the invention will be apparent from the following description and from the drawings.

Designation of figures

FIGURE 2 is a view looking downwardly at the top of the updraft tube, showing especially the swirl vanes therein.

FIGURE 3 is an elevational view partly broken away to a vertical section showing the bottomless sparger which is important to this invention.

Intent clause

Figure 1:
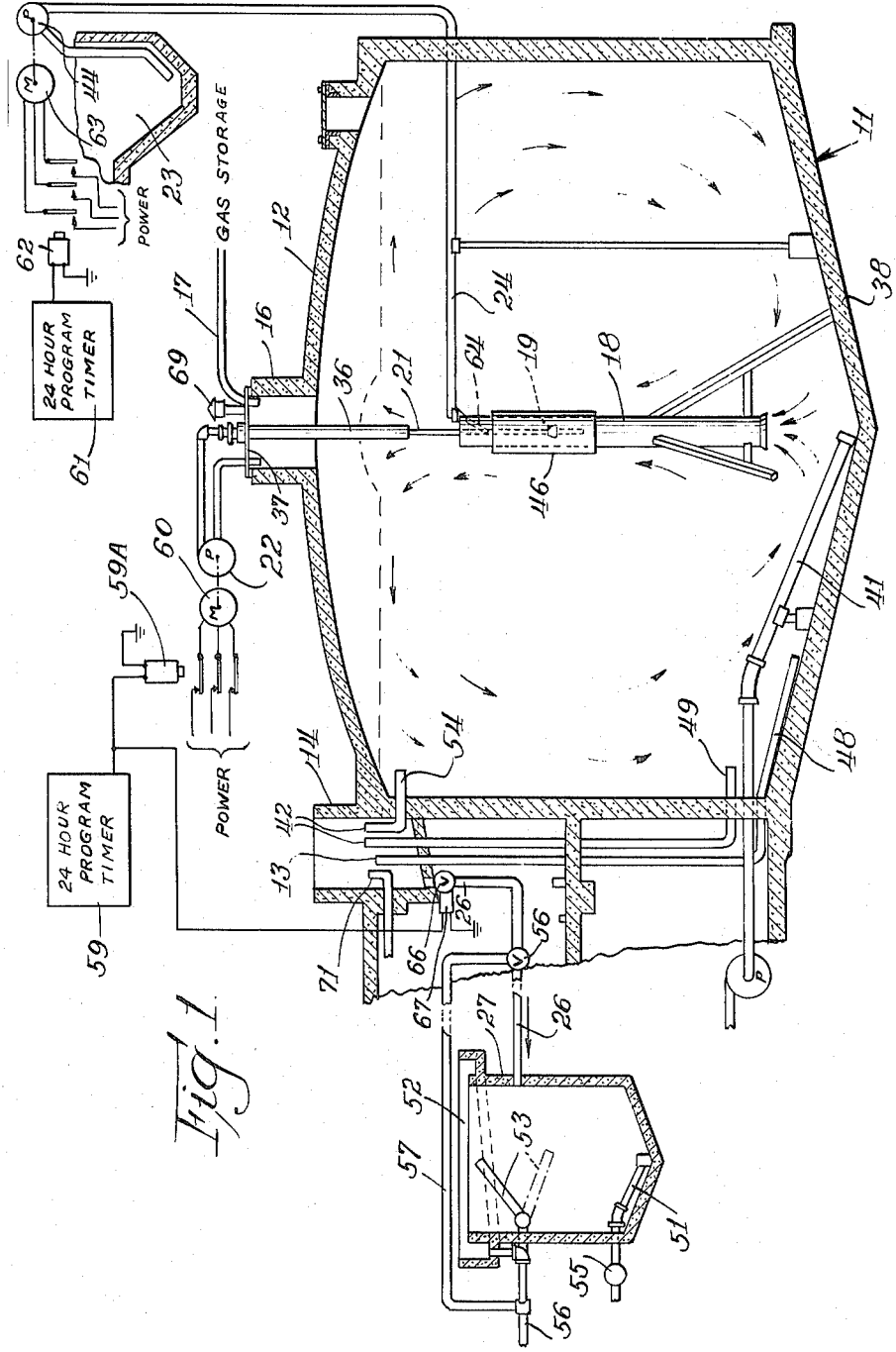
FIGURE 1 is a largely schematic view representing a vertical cross section through a digester embodying the major features of this invention, together with a relatively small quiescent settling tank.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements.

The claims at the end hereof are intended as the chief aid toward this purpose, as it is these that meet the requirement of pointing out the parts, improvements, or combinations in which the inventive concepts are found.

General description

The digester of this invention may utilize a conventional tank 11, which will often be a huge tank of 40 feet to 100 feet in diameter, other parts therefor being shown in considerably larger relative scale than the tank. The tank 11 includes a roof 12 which has been shown as a fixed roof, although floating roofs are also common. Tanks 11 are commonly maintained filled to a predetermined level which will ordinarily be largely determined by the level of the lowest overflow pipe 13 in a transfer or overflow control box 14.

Digesting sludge generates gas which includes methane and can be used for heat or power. Roofs 12 commonly have central gas domes 16 from which a pipe 17 leads to a gas storage tank or to a point of use.

It has long been common to provide means within the digester for stirring the contents thereof. There are advantages in using the illustrated form of stirring apparatus which comprises a vertically arranged updraft tube 18, centrally located in the digester and extending from a quite low level therein to a fairly high level, and having associated with it means for liberating gas within the updraft tube 18 to cause a rapid and voluminous flow of liquid upwardly through the tube to stir substantially the entire contents of the tank.

Except in very small tanks gas is liberated by a plurality of nozzles or spargers 19, only one being shown for the sake of simplicity. Each sparger 19 is supplied with gas by a separate supply pipe 21 extending downwardly through the roof and with which a pump 22 communicates. The pump 22 draws gas from the dome 16.

Raw sludge is usually pumped from a hopper 23 comprising part of the primary settling tank of the sewage treatment plant through a raw sludge line 24. As this raw sludge introduced raises the level of the liquid in the digester; this liquid will flow, for example, over the head of overflow pipe 13 into transfer box 14. From the transfer box 14 it will flow to the bottom drain thereof into transfer pipe 26 which, according to one aspect of the present invention, preferably leads to a relatively very small quiescent settling tank 27. It may, however, lead, as is conventional, to larger tanks, to lagoons, or to vacuum filters (perhaps preceded by elutriation).

Bottomless sparger

Inasmuch as intermittent operation of digester stirring equipment tends to be at the heart of various aspects of the present invention, it follows that if the stirring is to be accomplished by gas-lift action, the gas liberating system must be one which is entirely suitable for intermittent operation. An important feature of this suitability, and to which this application is broadly directed, is the bottomless sparger represented in FIG. 3, and described in elemental form in Serial No. 18,761, and from that description recognizable in Serial No. 56,132. This sparger is carried by the lower end of the gas supply pipe 21. In its preferred form shown here, the main body of the sparger comprises a fitting 31 similar to an ordinary pipe reducing coupling, the smaller end being threaded to supply pipe 21. The fitting or coupling 31 is provided with a plurality of short orifice tubes 32, the number at present preferred being six. The larger end of the fitting 31 carries, threaded to it, a blow-out tube 33 extending downwardly far enough so that it serves a gas-lock function in that ordinarily no gas will escape through it. In other words, gas is supplied to the spargers 31 at a pressure just high enough to force the required amount of gas through the short tube orifices 32, this pressure being less than the hydrostatic pressure at the foot of blow-out tube 33.

When it is desired to discontinue stirring, pump 22 is stopped, the pressure in supply pipe 21 falls and the contents of the digester enter the open bottom of the blow-out tube 33, pass upwardly through it, through fitting 31, and high enough into gas supply pipe 21 to reach the same liquid level as surrounds gas pipe 21. Pump 22 is preferably a rotary pump with intermeshing lobes having a slight clearance, and hence, once it comes to rest, it offers virtually no resistance to the reverse flow of gas from gas supply pipe 21 as the digester contents flow up into this pipe. The relatively large diameter of blow-out tube 33 causes the sludge to enter mainly through it, rather than through the orifices of tubes 32, thus reducing the chances of clogging these orifices.

If the digester stirring apparatus is shut off for a long period of time, most or all of the settleable solids in the liquid which enter the blow-out tube 33 will settle downwardly and either pass downwardly out through the blow-out tube 33 or settle within it. Which result occurs may depend on the nature of the surrounding digester contents. It is immaterial, however, which of these results occurs. When the pump 22 is again started, the gas pressure it produces quickly blows the liquid contents of tube 21, fitting 31 and blow-out tube 33 downwardly pushing out first any remaining settled or relatively settled solids and then scouring the surfaces, and the orifice tubes 32, with the relatively clear upper water from which the solids had settled. The large, smooth-walled blow-out tube 33, preferably of Koroseal (plasticized polymerized vinyl chloride) allows the water to blow through it very easily. Even if solids were gathered as a plug in pipe 21, this plug could be blown right out through blow-out tube 33.

When this action starts, there will be relatively little pressure differential between the inside and the outside of fitting 31 and hence the liquid will have little or no tendency to flow out through the orifice tubes 32. In fact, while the downflow through pipe 21 continues to be at high speed, its pressure, which would otherwise tend to cause it to flow outwardly through orifice tubes 32, is largely offset by its downward momentum and a venturi effect. However, as the water level in pipe 21 drops, the hydrostatic differential between the water inside the pipe and the water outside of the pipe will retard the downward flow of water and simultaneously exert greater outward pressure tending to force water through orifices 32. It is believed that toward the end of this stage, water which was highest in the pipe 21 and which is therefore likely to be relatively free of solids, is forced through the orifices 32. In any event, when the gas gets down to the level of the bottoms of orifices 32, it will escape through them and in the process of blowing them clear will scour their surfaces.

Preferably the orifice tubes 32 are of a smooth low friction plastic such as nylon or of a slick surface plastic such as Teflon (polymerized tetrafluoroethylene).

The plastic short tube orifice members 32 may be sufficiently secured and placed by press fits directly in holes in the coupler 31.

The steep inclination of the orifice members 32 (preferably in the neighborhood of 45° as shown) is advantageous in several respects. The gas exits with an upward component of movement so that its movement as well as its buoyancy tends to increase the waterflow. The 45° slant of the bore of the orifice tends to cause any settleable solids which are in the portion of water coming to rest in the bore to slide down the bore surface and leave the bore rather than settling on the bore surface with a possiblity of adhering thereto. In the event of emptying the digester, the sludge drains out of tubes 32. Also during operation the 45° upward inclination of the surfaces of the orifice members 32 which are exposed to flow tends to prevent any strands in the sewage sludge from "hanging up," during operation. There are numerous elongated materials in sludge, and fibers seem to form themselves into threads. Any surface perpendicular to the flow tends to catch such strands. After the first strand catches, it tends to catch more, and serious clogging of confined passages may result. The illustrated inclination of the inner ends of orifice members 32 sheds the strands, however, and this trouble is rarely, if ever, encountered. Also, the 45° upward inclination of orifice members 32 outside of coupler 31, where there is an induced upward flow, sheds strands.

It may be observed that gas-lock tube 36 extends from top plate 37, to which it is sealed, down to a sufficient level below the liquid level so that if the upper end of tube 36 is opened, no gas can escape from above the liquid. Accordingly, it is a simple matter to release the top end of supply pipe 21 and draw it with its sparger 19 upwardly through the gas-lock tube 36 for cleaning of the sparger. More often, this is merely for inspection of the sparger to find that it needs no attention.

Each tube 36 positions its sparger accurately within the updraft tube 18 so as to provide a good distribution of the gas liberation therein. Since these updraft tubes may be several feet in diameter, and since they pump against substantially no head pressure, it is apparent that huge quantities of the digester content flow upwardly through the updraft tube 18. Indeed, it is desired that these quantities be large enough to sweep the surface substantially clear of grease and scum. Likewise, it is desired by many designers to have the updraft tube 18 extend down close enough to the bottom so that the conical bottom 38 of tank 11 will be scoured and any grit and silt will be moved to the center of the cone. The finer silts and virtually all digestible solids will be drawn into the updraft tube 18. A small mound of coarser grit may gather immediately under the updraft tube, but that is sometimes thought to be desirable so that it may be drawn out through sludge draw-off pipe 41.

Selective sludge transfer facilities

It is common practice, especially with fixed-cover digesters, to displace sludge from the digester by causing it to overflow when raw sludge is pumped into the digester. It is also common to provide the transfer box represented by the box 14 with a plurality of overflow pipes leading to different levels in the digester, so that the operator can select the level which gives the best quality of displaced liquid. Usually such selection in the past has been on the basis of selecting the level at which the clearest effluent or supernatant would be drawn. Shiftable collars or sleeves 42 may extend the overflow pipes from which overflow is not desired to a level higher than the overflow level, leaving only one pipe in the active overflow condition.

In the past, the three levels from which choice could be made have usually all been in the upper one-third to two-thirds of the tank. There has, however, been at least one instance of an overflow pipe extending to a point adjacent the bottom cone of the tank. According to the present invention, there is at least one and preferably a plurality of low-level overflow draw-offs, as well as at least one high-level overflow draw-off. One high-level draw-off is at present believed to be enough in a tank which is frequently vigorously stirred. During stirring the level makes little difference. After a quiet period, the upper level is believed to be uniformly the clearest, or the best supernatant if supernatant type of draw-off is desired.

After raw sludge is introduced, if the digester is vigorously stirred and the raw sludge thoroughly interspersed throughout the contents of the digester, the raw sludge has maximum chance of coming into contact with the bacteria which caused digestion and the production of methane gas. Under such circumstances, a high proportion of the digestion of the raw sludge occurs quite rapidly. After several hours, when the gas production has fallen to a low level, it is then possible, at least in many instances, to obtain a moderate degree of separation between supernatant and settled solids fairly rapidly if the stirring equipment is turned "off." The time of digesting required after the last introduction of fresh sludge before such settling can take place varies with the type of sludge and loading and is readily determined by experience, but at least six hours is at present preferred. It is possible that only with a gas-lift type of updraft tube stirring equipment can this degree of rapid digestion be achieved in a huge digester at practical cost. In any event, when the gas generation within the digester has reached such a low level that this alone will not cause substantial stirring of the digester contents, it is preferred according to the present invention to discontinue the operation of the stirring equipment and allow the heavier, more thoroughly digested solids to concentrate in the lower portion of the digester leaving, at the top, a supernatant layer which will vary in clarity with the sludge being digested.

After such settling or stratification has occurred, the heavier and presumably better digested sludge is preferably removed from the lower portion of the digester. According to the illustrated form of digester, this is accomplished by introducing raw sludge to the digester, as by operating pump 44, while a low level overflow draw-off pipe 48 or 49 is arranged for overflow. The discharge of raw sludge should be at such a point that the raw sludge will not find its way to any of the overflow sludge draw-off pipes, or at least not to the one which is to be used. Some engineers prefer to discharge the raw sludge into the updraft tube 18, so that if the raw sludge is introduced while the stirring apparatus is in operation, it will immediately have the most thorough possible intermixing with the digester contents. However, discharging the sludge near the wall at a point well spaced around the tank from the draw-off pipes 48, 49 and 54 is also desirable because this simplifies piping, and its density, aided by the rolling movement will soon carry it to the draft tube anyway.

The updraft tube 18 may be fitted with a heater jacket 46 through which hot water is circulated while the stirring apparatus is operating, if the tank temperature is below that desired, usually about 95° F. If the sludge is delivered into the top of the updraft tube, the hot water may be supplied during such delivery, even if the stirring apparatus is "off," so that the sludge will be heated as well as being intermixed with more digested sludge which is also within the updraft tube 18. The early heating is advantageous partly in starting digestion, and partly in minimizing the density currents as the raw sludge flows downwardly. At present one preferred point for introduction of the raw sludge is directed into the updraft tube near the periphery thereof and tangentially so as to cause maximum intermixing with the heated digesting sludge within the tube and perhaps direct surface contact with the heated portion of the updraft tube 18.

FIG. 1 shows only the lowest overflow pipe 48 in overflow condition, overflow in the other two pipes being blocked by sleeves 42. The pipe 48 extends part way (perhaps half-way) down the cone 38 forming the bottom of the digester. As the raw sludge finds its way to the very bottom of the cone, the lower end of overflow pipe 48 may be in approximately the preferred, or best position for drawing the heaviest and presumably relatively well-digested sludge, free from any of the raw sludge just being introduced. In the case of large doses of raw sludge being introduced at one time, or if the density currents cause considerable stirring in the bottom of the digester, a slightly higher level may prove more advantageous. Accordingly, a second overflow pipe 49 has its intake end located just a short distance, not over a few feet, above the top of the bottom cone 38 of the tank. By lowering or removing sleeves 42 from the upper end of pipe 49 and applying or raising such a sleeve or sleeves on the upper end of pipe 48, the overflow will be drawn from the region of the bottom of pipe 49. The draw-off pipes, especially pipes 48 and 49, are preferably 8 inch pipes and provided with conventional facilities for permitting ramming out in the event of clogging.

If it is found that the sludge thus drawn by overflow action from the digester has a sufficiently high solids content for ultimate disposal on beds or for filtering, it may be suitably conducted for such disposal or treatment. The illustrated form of the invention assumes, however, that the solids content will not be that high. Accordingly, it will flow from overflow or transfer box 14 through pipe 26 to quiescent settling tank 27. It is believed that with the vigorous stirring and ideal intermixing and seeding of the raw sludge followed by several hours of digestion, and by rigorous exclusion of raw sludge from the transfer sludge, that the sludge delivered to quiescent settling tank 27 will settle and supernate rapidly. Accordingly, it is believed that the quiescent settling tank 27 may be relatively quite small, sized perhaps for one day's detention period. This settling tank may be conventional and may include a bottom drawoff 51, an overflow trough 52 and a selective decanter 53. The draw off of settled sludge may be controlled by a valve or pump 55 depending upon whether gravity flow or pumping is used. Decanting will occur whenever the tank 27 overflows or when the movable decanting pipe 53 is lowered beneath the surface of the level within the tank 27.

If the sludge drawn from pipes 48 or 49 has substantially higher solids content than the average in tank 11, the average solids content will gradually be reduced. This can be offset by an occasional high-level overflow through pipe 54. By removing or lowering the sleeve from this pipe while blocking overflow from pipes 48 and 49 by the sleeves thereon, the overflow, upon introducing raw sludge, will be through pipe 54. If the high-level overflow produces satisfactory supernatant, it may be delivered directly to the supernatant line 56 through connecting line 57. This is done by shifting valve 58 which may be a manual valve for directing the outflow from overflow box 14 to either pipe 57 or pipe 26.

Operation by program timer

To facilitate ideal operation, at least one program timer is preferably provided. Because of distances, and to use standard program timers, two program timers may be desirable. Program timer 59, by relay 59A of the conventional starter, controls the operation of the gas-lift stirring apparatus. Specifically it controls operation of motor 60 which drives pump or compressor 22. Program timer 61 has also been shown, for controlling, by starter relay 62, motor 63 for pump 44 which draws settled sludge from the primary settling tank and introduces it to the digester. Inasmuch as sewage plant operators are accustomed to operating this pump on a time schedule program timer 61 may be omitted.

Because program timers 59 and 61 are both twenty-four hour timers and hence are inherently synchronized by their synchronous motor drives which are synchronized by the common source of power, their programs may readily be correlated for the prescribed schedule of operations. Jointly considered they are, in effect, a single program timing means for both functions. As an example of timer operation, the raw sludge pumping may be started at each 7 o'clock and discontinued at each 7:30, by program timer 61. Program timer 59 can start the gas-lift stirring at each 7:30 (or perhaps 7:45 as will be described) and discontinue it, say, one hour later. There will thus be in the neighborhood of ten hours for settling, if that should be found to the desirable. It is believed, however, that most operators will want several hours of vigorous stirring, allowing less time for settling. In any event, program timer 59 should preferably discontinue the stirring action long enough ahead of 7 o'clock for such stratification to occur as will occur readily. At present it is believed that there should be at least one-half hour, but inasmuch as digestion apparently proceeds for quite some time without further stirring, once there has been vigorous intermixing, it is at present believed that an hour or two hours might well be allowed for this settling with at least the advantage of saving power costs.

Swirl vanes 64 are preferably provided in updraft tube 18, as seen best in FIG. 2, to ensure intermingling of sludge from one part of the digester with sludge in other parts. This would be especially important if an operator should introduce raw sludge during stirring, or if there should be, for any reason, a concentration of raw sludge on one side of the digester. These vanes are steep and tapered off downwardly to avoid catching strands, but are designed to provide substantial deflection of the flow striking them.

Stirring-overflow interlock

With a displacement overflow system, overflow is not exactly synchronized with the introduction of raw sludge. The liquid level is slow to reach its maximum and slow to return to normal. Starting the stirring immediately at the termination of introduction of raw sludge would therefore result in some minor transfer of raw sludge, if nothing were done to prevent it. According to the present invention, the stirring and overflow are "interlocked," or correlated. Thus, ideally, a powered valve 66 is controlled by the program timer 59 to shut off the transfer line 26 when the digester stirring equipment is started. Preferably the control solenoid or power element 67 must be energized to close line 26 so that it will have "fail safe" characteristics. Also this permits it to be connected in parallel with relay 59A.

The liquid level tends to be at a maximum when the introduction of raw sludge is terminated. Accordingly, it is preferable to delay actuation of the mixer and the closing of valve 66 until the liquid level is more nearly normal. A fifteen minute delay is believed appropriate. Until designing engineers are satisfied the valve 66 will be trouble-free. They may, without such valve, often obtain better correlation than heretofore simply by such a delay in actuation of the mixer.

Fixed roof digesters are commonly provided with vacuum-pressure relief valves 69 to guard against excessive pressure differentials. Other safety provisions can be provided to guard against pumping sludge into the digester if the level therein is too high, or a safety high-level drain 71 may be provided in box 42 by-passing any possible obstruction such as valve 66.

It is believed valve 66 can be both simple and of non-clog nature by using a vane hinged at its upstream edge, at one flat-sided wall of the conduit. The valve need not be a completely tight valve. It is sufficient that the outflow be substantially prevented. Until proved trouble-free, it is preferably located at a point of outflow from the overflow box. Accessibility at this point would permit taking some risk of occasional clogging.

Further details

It should be understood that the features of this invention described under the heading "Bottomless Sparger" are quite valuable and important whether or not the other features described (and which they help make practical) are used.

If raw sludge is allowed to settle, it is important that the stirring vigor be sufficient to draw off sludge from any pool of this raw sludge of significant size which may form at the bottom of the tank. Present commercial practice is to locate the bottom of the updraft tube about four feet from the bottom of the conical tank bottom and to provide a tube of large enough diameter and having enough gas introduced to it so that the flow through the tube in the course of forty-five minutes or less equals the volumetric capacity of the tank. Probably this flow is much more than is needed to draw in any pool of raw sludge, inasmuch as it tends to be stirred up by any flow down along the outer walls of the tank which tends to follow the bottom cone. In any digester, simple tests will determine whether or not the pool is being drawn in. For example, when the stirring apparatus has been operating for an hour or so after the discontinuance of introduction of raw sludge, a sample of sludge can be drawn from the bottom of the cone, through the bottom draw-off line, and its character determined. If its content of volatile solids is much higher than the average in the tank, a more vigorous stirring or draw-in effect should be provided. This may be by lowering the bottom of the updraft tube or by an increased supply or better distribution of the introduced gas. It should be understood that if the volatile solids content is only about ten per cent higher than the tank average, this should not be taken to mean a continuing pool of raw sludge unless tests at other points deep in the tank show that the tank is so well stirred that this relatively small percentage is significant.

It should be understood that the orifice tubes should be spaced apart at their inner tips by more than the diameter of the gas supply pipe so that they will not obstruct the flow of a relatively solid mass out from the gas supply pipe.

The length of the blow-out tube should be sufficient so that the pressure at the orifices normally desired for substantial flow would not cause the gas to blow out through the bottom of the tube. Twenty inches is adequate and allows a safe margin. A substantial pressure drop through the orifice tubes is desirable so as to ensure uniformity of flow through the various tubes.

According to present practice, the tank should be maintained at a uniform temperature at which digestion proceeds at a satisfactory rate, such as 95° Fahrenheit.

I claim:
1. The method of operating a digester:
   in which the digester comprises a tank, means for feeding to the tank sewage sludge to be digested therein, stirring means for vigorously stirring a large body of sludge within the tank, and draw-off means having its opening for outflow from the main space of the tank positioned to draw sludge from a draw-off area subject to the stirring action of the stirring means but located at a point to which the freshly fed sludge to be digested is not likely to move by gravimetric influences when the stirring means is not operating;
   said method comprising operating said stirring means to cause thorough intermixing of the sludge fed to be treated with sludge which has been undergoing digestion, for seeding the sludge to be treated;
   periodically causing sludge from the tank to flow through said draw-off means but at intervening periods maintaining the sludge draw-off means idle;
   and consistently discontinuing the operation of the stirring means before and during the outflow of sludge through said draw-off means to avoid the moving of sludge freshly fed to said draw-off area.
2. A digester for liquid waste-treatment sludge including
   a tank,
   inflow means for supplying sludge to the tank to be digested,
   overflow draw-off means having its intake opening in the tank, and including
   an outflow pipe, for withdrawing the liquid contents from the digester in response to a raised level or hydrostatic head within the digester, and
   means for stirring the contents of the digester including an energizing motor therefor; including
   means for controlling the motor for intermittent operation of the stirring means, and
   means automatically correlated with said control means to control the overflow means for preventing outflow through the outflow pipe while said motor is operating;
   said overflow intake being located away from the gravity path of sludge discharged from the inflow means.
3. A digester for liquid waste-treatment sludge including
   a tank,
   inflow means for supplying sludge to the tank to be digested,
   overflow draw-off means having its intake opening in the tank, and including
   an outflow pipe, for withdrawing the liquid contents from the digester in response to a raised level or hydrostatic head within the digester, and
   means for stirring the contents of the digester including an energizing motor therefor; including
   timing means for controlling the motor for intermittent operation of the stirring means, and
   means automatically correlated with said control means to control the overflow means for preventing outflow through the outflow pipe while said motor is operating;
   said overflow intake being located away from the gravity path of sludge discharged from the inflow means.
4. A digester for liquid waste-treatment sludge including
   a tank provided with a roof sealing the tank to retain gases therein,
   inflow means for supplying sludge to the tank to be digested,
   overflow draw-off means having its intake opening in the tank, and including
   an outflow pipe, for withdrawing the liquid contents from the digester in response to a raised level or hydrostatic head within the digester, and
   means for stirring the contents of the digester including: an energizing motor therefor,
      a gas liberating device positioned generally within the digester and substantially beneath the liquid level therein for liberating gas to stir the digester by the rising action of the gas, and
      means for drawing gas from within the digester, compressing it and discharging it through said liberating device, including a gas supply conduit leading to the gas liberating device from the means for compressing the gas, and
      an updraft tube surrounding the gas liberating device and extending from close to the bottom of the tank to a point substantially higher but substantially below the liquid level,
   including means for controlling the motor for intermittent operation, and
   including means automatically correlated with the operation of the motor for controlling the overflow means to prevent outflow through the outflow pipe during operation of the motor;
   the stirring means having sufficient vigor to cause any pool of green sludge collecting in the bottom of the tank during a period when the stirring means is inactive to be drawn promptly into the updraft tube and disbursed through the tank,
   and the overflow intake being positioned away from the gravity path of sludge discharged from the inflow means.
5. A digester for liquid waste-treatment sludge including
   a tank provided with a roof sealing the tank to retain gases therein,
   inflow means for supplying sludge to the tank to be digested,
   overflow draw-off means having its intake opening in the tank, and including
   an outflow pipe, for withdrawing the liquid contents from the digester in response to a raised level or hydrostatic head within the digester, and
   means for stirring the contents of the digester including an energizing motor therefor, a gas liberating device positioned generally within the digester and substantially beneath the liquid level therein for liberating gas to stir the digester by the rising action of the gas, and means for drawing gas from within the digester, compressing it and discharging it through said liberating device, including a gas supply conduit leading to the gas liberating device from the means for compressing the gas, and an updraft tube surrounding the gas liberating device and extending from close to the bottom of the tank to a point substantially higher but substantially below the liquid level, including means for controlling the motor for intermittent operation;

the gas liberating device including:

a body forming a central chamber communicating at its top with the gas supply pipe and having orifices surrounding the axis of said gas supply pipe and communicating with the chamber above its bottom and a blow-out tube extending steeply downwardly from said chamber, aligned with said pipe, and of an internal diameter larger than that of the pipe, whereby any pluglike mass forming within said pipe during a period when the stirring means is inactive can be blown through or into the blow-out tube to clear the passages from said pipe to said orifices.

6. A digester for liquid waste-treatment sludge including a tank provided with a roof sealing the tank to retain gases therein, inflow means for supplying sludge to the tank to be digested, overflow draw-off means having its intake opening in the tank, and including an outflow pipe, for withdrawing the liquid contents from the digester in response to a raised level or hydrostatic head within the digester, and means for stirring the contents of the digester including an energizing motor therefor;

a gas liberating device positioned generally within the digester and substantially beneath the liquid level therein for liberating gas to stir the digester by the rising action of the gas, and means for drawing gas from within the digester, compressing it and discharging it through said liberating device, including a gas supply conduit leading to the gas liberating device from the means for compressing the gas having its portion of the supply pipe below the liquid level extend steeply downwardly to the gas liberating device; and in which the gas liberating device includes a body forming a central chamber communicating at its top with the gas supply pipe and having orifices surrounding the axis of said gas supply pipe, said orifices being of a size designed for providing a small back pressure on outflowing gas to maintain equality of flow between the various orifices, and communicating with the chamber above its bottom and a blow-out tube extending steeply downwardly from said chamber, aligned with said pipe, and of an internal diameter substantially larger than that of the pipe, whereby liquid sludge will flow with extreme ease through the blow-out tube at the beginning and end of periods when the stirring means is inactive, thereby substantially protecting the orifices from the flow of sludge through them.

7. A digester for liquid waste-treatment sludge including a tank provided with a roof sealing the tank to retain gases therein, inflow means for supplying sludge to the tank to be digested, overflow draw-off means having its intake opening in the tank, and including an outflow pipe, for withdrawing the liquid contents from the digester in response to a raised level or hydrostatic head within the diegster, and means for stirring the contents of the digester including:

an energizing motor therefor;

a gas liberating device positioned generally within the digester and substantially beneath the liquid level therein for liberating gas to stir the digester by the rising action of the gas, and means for drawing gas from within the digester, compressing it and discharging it through said liberating device, including a gas supply conduit leading to the gas liberating device from the means for compressing the gas having its portion of the supply pipe below the liquid level extend steeply downwardly to the gas liberating device; and in which the gas liberating device includes a body forming a central chamber communicating at its top with the gas supply pipe and having orifices surrounding the axis of said gas supply pipe and a blow-out tube extending steeply downwardly from said chamber, aligned with said pipe, and of an internal diameter larger than that of the pipe, whereby any pluglike mass forming within said pipe during a period when the stirring means is inactive can be blown through or into the blow-out tube to clear the passages from said pipe to said orifices;

said orifices being formed by short tubes of smooth low-friction plastic steeply inclined to shed solids engaging them and communicating with the chamber above its bottom.

8. A digester for liquid waste-treatment sludge including a tank provided with a roof sealing the tank to retain gases therein, inflow means for supplying sludge to the tank to be digested, overflow draw-off means having its intake opening in the tank, and including an outflow pipe, for withdrawing the liquid contents from the digester in response to a raised level or hydrostatic head within the digester, and means for stirring the contents of the digester including an energizing motor therefor;

a gas liberating device positioned generally within the digester and substantially beneath the liquid level therein for liberating gas to stir the digester by the rising action of the gas, and means for drawing gas from within the digester, compressing it and discharging it through said liberating device, including a gas supply conduit leading to the gas liberating device from the means for compressing the gas having its portion of the supply pipe below the liquid level extend steeply downwardly to the gas liberating device; and in which the gas liberating device includes a body forming a central chamber communicating at its top with the gas supply pipe and having orifices surrounding the axis of said gas supply pipe and a blow-out tube extending steeply downwardly from said chamber, aligned with said pipe, and of an internal diameter larger than that of the pipe, whereby any pluglike mass forming within said pipe during a period when the stirring means is inactive can be blown through or into the blow-out tube to clear the passages from said pipe to said orifices;

said orifices being formed by short tubes of smooth low-friction plastic steeply inclined to shed solids engaging them and located entirely outside of the path comprising a projection of the bore of the pipe and communicating with the chamber above its bottom.

9. A gas liberating device for submersion in liquid sludge including a body forming a central chamber, having a communicating fitting at its top for connection with a gas supply pipe and having outflow orifices surrounding the axis of said fitting, said orifices communicating with the chamber above its bottom for the discharge from the chamber of gas supplied to the chamber through said fitting, and an open bottomed blow-out tube, comprising a back-pressure producing gas-lock tube, extending steeply downward from said chamber along said axis a length to provide, when submerged in said liquid sludge, a sufficient back-pressure before discharge through the gas-lock tube as to cause a substantial flow through the orifices, and of an internal diameter throughout its length larger than that of the pipe for which the fitting is adapted, whereby liquid sludge, should it enter the device when the device is not liberating gas, will flow with extreme ease through the blow-out tube at the beginning and end of periods when no gas is being liberated through the device thereby substantially protecting the orifices from the flow of sludge through them.

10. A gas liberating device for submersion in liquid sludge including a body forming a central chamber, having a communicating fitting at its top for connection with a gas supply pipe and having outflow orifices surrounding the axis of said fitting, said orifices communicating with the chamber above its bottom for the discharge from the chamber of gas supplied to the chamber through said fitting, and an open bottomed blow-out tube, comprising a back-pressure producing gas-lock tube, extending steeply downward from said chamber along said axis a length to provide, when submerged in said liquid sludge, a sufficient back-pressure before discharge through the gas-lock tube as to cause a substantial flow through the orifices, and of an internal diameter throughout its length larger than that of the pipe for which the fitting is adapted, whereby liquid sludge, should it enter the device when the device is not liberating gas, will flow with extreme ease through the blow-out tube at the beginning and end of periods when no gas is being liberated through the device thereby substantially protecting the orifices from the flow of sludge through them; said orifices being formed by short tubes of smooth low-friction plastic steeply inclined to shed solids and stringy material which may engage them and communicating with the chamber above its bottom to discharge from the chamber gas supplied to the chamber through said fitting.

11. Submerged-blast gas liberating apparatus for submersion in liquid sludge including a gas supply pipe extending generally vertically, wall means forming a chamber at the foot of said supply pipe, means forming outflow orifices substantially around the foot of the pipe and communicating with the pipe for discharge therefrom through openings in wall portions of said wall means, the inner surfaces of which face other than upwardly, and an open bottomed blow-out tube, comprising a back-pressure producing gas-lock tube, extending steeply downward from said chamber along said axis a length to provide, when submerged in said liquid sludge, a sufficient back-pressure before discharge through the gas-lock tube as to cause a substantial flow through the orifices, and of an internal diameter throughout its length larger than that of said supply pipe for which the fitting is adapted, whereby liquid sludge, should it enter the device when the device is not liberating gas, will flow with extreme ease through the blow-out tube at the beginning and end of periods when no gas is being liberated through the device thereby substantially protecting the orifices from the flow of sludge through them.

12. A digester for liquid waste-treatment sludge including
  a tank,
  inflow means for supplying sludge to the tank to be digested,
  overflow draw-off means having its intake opening in the tank, and including
  an outflow pipe, for withdrawing the liquid contents from the digester in response to a raised level or hydrostatic head within the digester, and
  means for stirring the contents of the digester including an energizing motor therefor; including
  timing means for controlling the motor and automatically correlating its operation with the inflow and overflow to prevent operation of the motor while overflow is occurring, even through a period subsequent to the inflow.

References Cited by the Examiner

UNITED STATES PATENTS

| | | | |
|---|---|---|---|
| 1,448,876 | 3/1923 | Sladden | 239—566 X |
| 2,064,529 | 12/1936 | Fischer et al. | 210—14 |
| 2,144,386 | 1/1939 | Nordell | 210—139 |
| 2,186,371 | 1/1940 | Durdin | 210—221 X |
| 2,538,412 | 1/1951 | Cecil et al. | 210—14 X |
| 2,638,444 | 5/1953 | Kappe | 210—194 |
| 2,720,489 | 10/1955 | Walker | 210—14 X |
| 2,987,186 | 6/1961 | Burgoon et al. | 210—220 X |
| 3,055,502 | 9/1962 | Cunetta | 210—14 X |
| 3,104,672 | 9/1963 | Holdren | 239—560 X |

FOREIGN PATENTS

| | | |
|---|---|---|
| 195,355 | 1/1958 | Austria. |
| 1,013,342 | 7/1952 | France. |

OTHER REFERENCES

Sperry et al.: Can Digester Recirculation Be Overdone? Sewage and Industrial Wastes, June 1953, vol. 25, pp. 741–744.

MORRIS O. WOLK, *Primary Examiner.*

HERBERT L. MARTIN, *Examiner.*